United States Patent [19]

Robinson et al.

[11] Patent Number: 4,897,443

[45] Date of Patent: Jan. 30, 1990

[54] POLYSULFIDE SHEETING

[75] Inventors: Raymond Robinson, Coventry; Timothy C. P. Lee, Kenilworth, both of England; Peter Endruscheit, Weinheim, Fed. Rep. of Germany; Lothar Hockenberger, Ludwigshafen, Fed. Rep. of Germany; Franz-Josef Bergmann, Laudenbach; Karl Ruehl, Bad Nauheim; Ernst Scherp, Bruchkoebel, Fed. Rep. of Germany

[73] Assignee: Rutgerswerke Aktiengesellschaft, Frankfurt, Fed. Rep. of Germany

[21] Appl. No.: 139,993

[22] Filed: Dec. 31, 1987

[30] Foreign Application Priority Data

Jan. 3, 1987 [DE] Fed. Rep. of Germany ....... 3700134

[51] Int. Cl.$^4$ .............................................. C08L 81/04
[52] U.S. Cl. ...................................... 524/609; 524/881
[58] Field of Search ........................ 524/609, 881, 775

[56] References Cited

U.S. PATENT DOCUMENTS

| | | | |
|---|---|---|---|
| 2,206,643 | 7/1940 | Patrick | 524/881 |
| 3,659,896 | 5/1972 | Smith et al. | 524/881 |
| 3,852,214 | 12/1974 | Gallagher et al. | 524/609 |
| 4,156,752 | 5/1979 | Riccitiello et al. | 428/418 |
| 4,518,767 | 5/1985 | Miller | 528/374 |
| 4,608,433 | 8/1986 | Meyer et al. | 528/388 |

OTHER PUBLICATIONS

Thiokol/Specialty Chemical Division, "LP-2 Liquid Polysulfide Polymer", 3/83, pp. 5, 8–9 and 15.
Lee, Dr. Timothy C. P., "LP-2 Manganese Dioxide Compounds for the Rubber Industry", Sep. 24, 1984, pp. 3–4 and Tables.
Thiokol Chemicals, "Target in on . . . ", p. 5, Table 2.

*Primary Examiner*—Melvyn I. Marquis
*Assistant Examiner*—Daniel W. Woodward
*Attorney, Agent, or Firm*—Gerald K. White

[57] ABSTRACT

Polysulfide sheeting is prepared by mixing a curable polysulfide oligomer or polymer, carbon black, and manganese dioxide as a hardening catalyst; forming the composition into a sheet; and curing the sheet at an elevated temperature. The sheeting has unusually high short-term heat resistance, so it will not lose its watertightness when coated with hot-laid asphalt at 240° C. It has better resistance to ultraviolet light than conventional polysulfide sheeting, and good penetration and compression set resistance. The sheeting can be laminated to a reinforcing layer, if desired. A continuous waterproofing layer can be formed by laying pieces of the sheeting in overlapping relation, placing an uncured polysulfide rope between the overlapping edges of adjacent pieces of sheeting, and curing the rope, thus joining the pieces to form an integral sheet. Such waterproof layers can be incorporated into paving for bridges, roofs, and other structures.

3 Claims, No Drawings

POLYSULFIDE SHEETING

TECHNICAL FIELD

The invention relates to sheeting made of polymeric polysulfide material, which can be used as waterproofing sheeting in problematic areas such as roofs and bridge paving, and which guarantees a reliable, complete and long term barrier.

BACKGROUND ART

Polymeric sheeting made of polyvinyl chloride, polyethylene, polypropylene, or terpolymers made from an ethylene propylene diene monomer are used for waterproofing bridges or roofing, or for lining landfills or storage areas for chemicals. However each of these types of polymeric sheetings has certain disadvantages, as for instance lack of resistance to atmospheric corrosion, ultraviolet light (UV), chemicals, solvents or temperature or unsatisfactory elasticity or pressure resistance when a load is applied for a long time. In addition there are problems with bonding different sheetings with each other because solvent containing material or different polymers are used as glue, or because layers must be joined by the influence of heat. In each case the danger exists that the single sheetings are not joined perfectly enough to be waterproof.

Therefore, it is the task of the present invention to develop a polymeric sheeting which does not have the aforementioned disadvantages, and which can be used without problems in the different application areas.

It is known from West German published patent application No. 21 38 171 that elastic sealing tapes made with polysulfides can be glued to different surfaces with chemically curing polysulfide compounds so that the glue and the tapes react to form a chemically uniform, integral material. However the respective tapes and joints are not sufficiently resistant to UV, continuous pressure and temperature to be used for waterproofing under hot-laid asphalt paving or roofing.

SUMMARY OF THE INVENTION

It was found that compounds of polysulfide oligomers or polymers with carbon black and a curing agent based on $MnO_2$, cured at an elevated temperature, provide sheetings which have the desired profile of properties. As can be expected from the properties of the polysulfide oligomers or polymers used, these sheetings are continuously elastic even at temperatures down to $-45°$ C., resistant to atmospheric corrosion and to chemicals, and have high tear strength. They can be joined without heat with ropes of analogous or identical uncured polysulfide compounds so that a chemically uniform bond and a continuous sheet results.

Surprisingly, these sheetings have additional valuable properties which could not be expected from the previously known properties of polysulfide compositions. These sheetings are extremely resistant to UV and have good penetration and compression set resistance and an improved resistance to high temperatures.

Thus, the sheetings of the invention show only a slight loss of surface gloss even after more than 300 days of strong UV-radiation or exposure to a year of sunlight. The continuous penetration and compression set resistance guarantees that even after loading the sheeting with heavy stones for a long time, it is not damaged. After this compression is removed, there is nearly complete recovery of the original surface of the sheeting.

The temperature resistance of these sheetings is increased so they will endure heating for several hours up to 180° C. without any damage. They can be exposed for a short time to a material having a temperature of 240° C., for example, hot-laid asphalt.

Due to these properties, the polymeric sheetings according to this invention can be used as elastic sheeting for roofing applications (especially in multi-story automobile parking structures), as protective sheeting in deposit areas for chemicals (especially for chemical waste), or as waterproofing for bridges and some highways, applied under the asphalt layer.

DESCRIPTION OF PREFERRED EMBODIMENTS

The sheeting compositions of the invention are prepared by mixing at least 1,000 parts by weight (pbw) of polysulfide oligomer or polymer with 300 to 700 pbw of carbon black, possibly additional additives, and a curing agent based on $MnO_2$.

The polysulfide oligomers and polymers used are those of the general formula $HS-(RS_x)_n-RSH$, wherein x is in the range of 1 to 3; n is in the range of 7 to 50; and R is an alkyl, alkylether or alkylthioether group wherein the alkyl group may have up to 6 carbon atoms. The preferred moiety R is a bis-ethyl formal group according to the formula

$$-C_2H_4-O-CH_2-O-C_2H_4-.$$

The molecular weight of these substances depends on the number n and on the size of the moiety R. Generally it is in the range of 800 to 8,000. These polysulfides have a viscosity at room temperature of 0.5 to 80 Pa.s. The polysulfide chains may be tri-functionally crosslinked up to 5%, preferably in the range of 0.1 to 2%.

The preferred carbon blacks are reinforcing or semi-reinforcing furnace or thermal types. The chosen carbon black is mixed with the polysulfide oligomer or polymer in a known manner under the influence of high shearing stress. A paste-like black mass is obtained.

This mass may contain additional additives, like small amounts of substances which promote or retard the curing reaction with the hardener. It can also contain 1 to 5% by weight of a reactive silane, preferably an epoxy-or mercapto-terminated silane, for example, silanes A 189 and A 187 sold by Union Carbide Corporation. This mass is mixed with a curing agent or hardener based on $MnO_2$ just before the plastic sheeting is made.

The curing agent or hardener is a pasty mass, made by mixing manganese(IV)-oxide with a plasticizer which is compatible with the polysulfide polymer or oligomer, e.g. a chlorinated paraffin, a hydrogenated terphenyl or a phthalate type plasticizer. This mixture may also contain substances which retard or promote the hardening reaction, for example, a molecular sieve or stearic acid. The proportions of weight of $MnO_2$ to plasticizer are in the range of 50-70 parts $MnO_2$ to 30-50 parts plasticizer.

The preferred $MnO_2$ is sold as polysulfide curing $MnO_2$. This is normally gamma- or delta-manganese(IV)-oxide which is activated by additional foreign ions. Such $MnO_2$ may contain up to 8% by weight water.

The $MnO_2$ is used in such a quantity that all the mercapto groups can be oxidized to form disulfide groups.

It is advisable that two or three times the stoichiometrically necessary quantity of MnO₂ be used.

After mixing the polysulfide mass with the curing agent, curing starts at room temperature by oxidation of the mercapto groups to disulfide groups. By choice of retarding or promoting agents, this curing process can be controlled so the mixture can be worked up between 5 minutes and several hours after it is mixed.

In this time the mixture can be transformed into sheeting by known processes, for example, by extrusion, calendering or knife coating. This sheeting is then completely cured by application of high temperature, usually 80° to 100° C., optionally by use of infrared or microwave radiation, so that a rubberlike, elastic sheeting with high extensibility results. The thickness of the sheeting is normally in the range of 0.5 to 3 mm. It is determined by adjusting the gap between the sheet forming tools.

The polymeric sheeting of the invention can be made either with or without a reinforcing layer. Such a layer may be a foil, fibers, a fabric, a mesh or a fleece made from a material which is compatible with the polysulfide oligomer or polymer to give a good composite, e.g. from glass, metal, cellulose, polyester or rubber-coated or rubber-impregnated incompatible material.

The polymeric sheeting also can be laminated on one side with a foil, a fabric or a fleece. In this instance, it is preferred that the overlapping edges are not laminated, so homogeneous bonds can be formed. The resulting sheeting can be bonded with another building material or with another piece of sheeting by interposing a polysulfide compound which has a composition similar to that of the polymeric sheeting between the materials to be bonded, then curing the interposed compound.

When polymeric sheetings according to the invention are bonded together with such a compound a chemically uniform, integral, unbroken material is obtained because the bond between the sheetings is homogenous and free of faults. It is a further advantage of the polymeric sheeting that it can be adhered with a compound of nearly identical material to nearly all solid substrates.

EXAMPLE 5,000 grams of polysulfide polymer having the average structure

HS—($C_2H_4$—O—$CH_2$—O—$C_2H_4$—SS)₂₃—$C_2H_4$—O—$CH_2$—O—$C_2$—$H_4$—SH with about 2% cross-linking, an average molecular weight of 4,000 and a viscosity at 27° C. of 35 to 45 Pa.s (Thiokol ® LP-2) are mixed in a double shaft mixer with 3,000 grams of a furnace carbon black (Printex ® 25). The resulting mass is mixed with 500 grams of a paste consisting of 58% by weight MnO₂, 38% by weight benzyl butyl phthalate, and 4% by weight curing promoter (tetraethylthiuram disulfide).

The resulting mixture is formed within 15 minutes by a calender process conducted at room temperature. The formed sheeting is 2 mm thick, corresponding to the gap between the rolls of the calender. This sheeting is cured by heating it to 100° C. for five to ten minutes, depending on the particular MnO₂ selected. This sheeting has the following properties:

E-modulus 100%: 2.5 N/mm²
max. elongation: 400%
tensile strength: 5.5 N/mm²
resistance to UV: after 350 days' Xenotest radiation or 100 days' radiation from a 300 watt OSRAM VITA LUX source of artificial sunlight, the latter being about equivalent to one year's exposure to sunlight, no change of the surface is observed.
resistance to temperature: 2 to 4 hours at 180° C.

Several of these polymeric sheetings (1 meter wide) are laid out side by side in overlapping relation on a subconstruction of a roadway of a bridge. A rope of a freshly mixed polysulfide composition of about 2 cm thickness is applied on the whole length of the edge of the first laid sheeting along its edge which is to be overlapped by the adjacent sheet, and the overlapping edge of the adjacent sheeting is laid on the edge of the first sheet so the edge areas are overlapping for about 5 cm. The rope of polysulfide is spread between the two sheetings and forms an unbroken, integral adhesive layer. The rope of polysulfide comprises the following ingredients:

| | |
|---|---|
| polysulfide polymer (the same as that of the sheeting) | 1,000 grs |
| furnace carbon black | 400 grs |
| manganese dioxide | 60 grs |
| benzyl butyl phthalate | 38 grs |
| stearic acid | 2 grs |

The mixing ratio of polysulfide mass (polysulfide and carbon black) to curing agent (remaining ingredients) is 1,400 to 100.

After 6 hours the polysulfide rope is sufficiently cured that a chemically uniform layer exists, covering the whole subconstruction of the roadway of the bridge. On this layer made with the polymeric sheetings an upper layer is made by applying and distributing a 240° C. hot mixture of asphalt.

Neither thermal nor mechanical forces inherent in this process damage the layer made with the polymeric sheetings, so that it is fully waterproof.

What is claimed is:

1. Polymeric sheeting consisting essentially of 1000 parts by weight of a polysulfide oligomer or polymer having the average structure:

$$HS(C_2H_4OCH_2OC_2H_4SS)_{23}C_2H_4OCH_2OC_2H_4SH$$

with about 2% cross-linking and an average molecular weight of 4000, 300 to 700 parts by weight of carbon black, and a hardener based on manganese dioxide, wherein said sheeting is formed by extrusion calendering, or knife coating, then cured at 80° C. to 100° C.

2. The polymeric sheeting of claim 1, wherein the mixture contains from 10 to 50 parts by weight of a reactive silane.

3. The polymeric sheeting of claim 1, wherein said hardener is 80 to 140 parts by weight of a paste consisting essentially of 50 to 70 percent by weight manganese dioxide and 30 to 50 percent by weight of a plasticizer.

* * * * *